C. D. COLE AND W. J. BURTT.
ADJUSTABLE HOOK FOR ANTISKID CHAINS.
APPLICATION FILED FEB. 6, 1922.

1,420,816.  
Patented June 27, 1922.

Inventors  
CHESTER D. COLE AND  
WINSLOW J. BURTT  
By Lester L. Sargent  
Attorney

UNITED STATES PATENT OFFICE.

CHESTER D. COLE AND WINSLOW J. BURTT, OF HAVERHILL, MASSACHUSETTS.

ADJUSTABLE HOOK FOR ANTISKID CHAINS.

1,420,816.   Specification of Letters Patent.   Patented June 27, 1922.

Application filed February 6, 1922. Serial No. 534,438.

*To all whom it may concern:*

Be it known that we, CHESTER D. COLE and WINSLOW J. BURTT, citizens of the United States, and residents of Haverhill, in the county of Essex and State of Massachusetts, have invented a new and useful Adjustable Hook for Antiskid Chains, of which the following is a specification.

The object of our invention is to provide a readily adjustable hook having improved means for securely fastening the ends of anti-skid chains to each other. We attain the objects of our invention by the mechanism illustrated in the accompanying drawings, in which—

Like numerals designate like parts in each of the several views.

Figure 1:
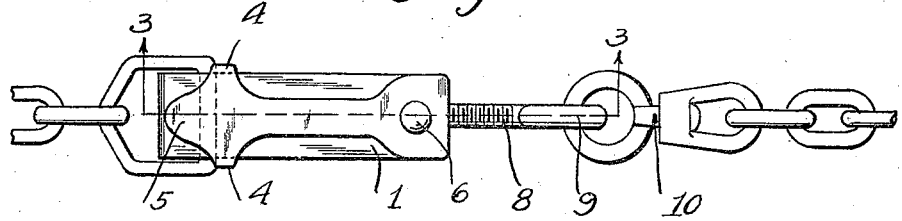
Figure 1 is a top plan of the invention.

Referring to the accompanying drawings, we provide a hook 1 having a hook socket 2 to engage the end or other link of an anti-skid chain. We provide a spring tongue 3 suitably secured to hook 1 by rivet 6 which permits of its being swung laterally to open the socket 2. The spring tongue 3 is provided with downwardly-bent side ears 4 engaging over the socket portion 2 and a downwardly-bent end 5 engaging over the end of the hook, as shown in Fig. 2.

Figure 2:
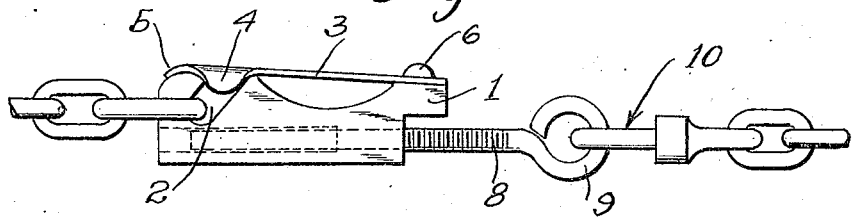
Fig. 2 is a side elevation of same.

We provide the body of hook 1 with a suitable threaded channel 7 in which is adjustably mounted the threaded shank 8 of the adjustable eye-member 9 which engages in a suitable swivel 10 attached to the anti-skid chain, as shown in Figs. 1 and 2. In operation the spring tongue 3 is swung laterally to receive the end link of the anti-skid chain and thence is swung back over the socket 4, forming an effective safety clasp to prevent the accidental disengagement of the skid chain from the hook. The hook may be adjusted to the desired length by securing the threaded shank 8 of the eye-member 9 farther into the threaded channel 7 of hook 1, to tighten the anti-skid chain, the swivel permitting of the free rotation of eye member 9 without unhasping the spring tongue 3 to permit of the necessary or desired adjustment.

Figure 3:
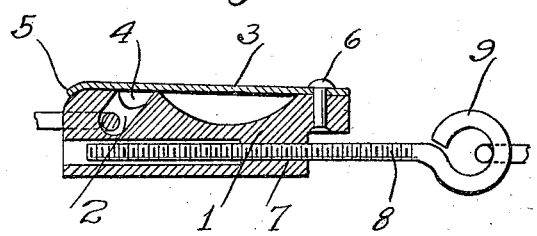
Fig. 3 is a longitudinal section on line 3—3 of Fig. 1 but with swivel 10 omitted.

The convenient means of adjusting of the hook permits of readily taking up the slack at the end of the chain. We may omit swivel 10, as in Fig. 3, if it is found that too much space is left between cross chains at the ends of the anti-skid chain.

What we claim is:

1. In a device of the class described, the combination of a hook member, said member having a hook socket, a spring tongue adapted to engage over the said socket, the other end of said spring tongue being pivotally attached to the hook and being laterally swingable, and means for connecting the other end of the hook with an anti-skid chain.

2. An adjustable hook for anti-skid chains, a hook member, said member having a hook socket, a spring tongue adapted to engage over the said socket, the other end of said spring tongue being pivotally attached to the hook and being laterally swingable, and longitudinally adjustable means for connecting the other end of the hook with an anti-skid chain.

3. An adjustable hook for anti-skid chains, a hook member, said member having a hook socket, a spring tongue adapted to engage over the said socket, the other end of said spring tongue being pivotally attached to the hook and being laterally swingable, and an eye member having a threaded shank, said threaded shank being adjustably mounted in the body of the hook.

4. An adjustable hook for anti-skid chains, a hook member, said member having a hook socket, a spring tongue adapted to engage over the said socket, the other end of said spring tongue being pivotally attached to the hook and being laterally swingable, an eye member having a threaded shank, said threaded shank being adjustably mounted in the body of the hook, and a swivel member engaged by the eye member to permit of free turning of the eye member to adjust the length of the device.

CHESTER D. COLE.
WINSLOW J. BURTT.